(12) United States Patent
Asada et al.

(10) Patent No.: US 7,869,108 B2
(45) Date of Patent: Jan. 11, 2011

(54) ELECTROMAGNETICALLY ACTUATED DEVICE

(75) Inventors: Norihiro Asada, Minato-ku (JP); Kenichi Kagawa, Minato-ku (JP)

(73) Assignee: Micro Precision Co. & Ltd., Tokyo (JP)

( * ) Notice: Subject to any disclaimer, the term of this patent is extended or adjusted under 35 U.S.C. 154(b) by 211 days.

(21) Appl. No.: 11/890,608

(22) Filed: Aug. 7, 2007

(65) Prior Publication Data

US 2008/0285107 A1 Nov. 20, 2008

(30) Foreign Application Priority Data

Aug. 8, 2006 (JP) .............................. 2006-215594

(51) Int. Cl.
*G02B 26/08* (2006.01)
(52) U.S. Cl. ................... 359/199.4; 359/225.1
(58) Field of Classification Search ... 359/198.1–199.4, 359/221.2, 223.1–225.1
See application file for complete search history.

(56) References Cited

U.S. PATENT DOCUMENTS 6,388,789 B1 * 5/2002 Bernstein ................. 359/198.1

* cited by examiner

*Primary Examiner*—Stephone B Allen
*Assistant Examiner*—Jennifer L. Doak
(74) *Attorney, Agent, or Firm*—James Creighton Wray; Meera P. Narasimhan

(57) ABSTRACT

The present invention provides an electromagnetically actuating optical deflecting elements which can be manufactured out of reduced number of components and are capable of being actuated at lower frequencies and at wider deflecting angles without causing mechanical influences of the metal wiring on beams of the optical deflecting element.

For that purpose, the electromagnetically actuating optical deflecting element comprises: a movable part having a light reflecting plane and a coil; a base component having a magnetic field generating means; and a pair of beams which axially support said movable part on to the base component, The movable part is actuated by an electromagnetic force generated by an electric current flowing through the coil and the magnetic field generating means. The beams 108 are constituted by one material having functions to perform as conductors for supplying electric current to the coil, to support the movable part, to perform as springs for returning the movable part to a starting position.

10 Claims, 10 Drawing Sheets

PRIOR ART

PRIOR ART

PRIOR ART

ELECTROMAGNETICALLY ACTUATED DEVICE

This application claims the benefit of Japanese Application No. 2006-215594 filed Aug. 8, 2006, which is hereby incorporated by reference in its entirety.

BACKGROUND OF THE INVENTION

1. Field of the Invention

The present invention relates to an electromagnetically actuating optical deflecting element suitable for small devices, particularly relates to physically improved beams which support a movable component of the optical deflecting element.

2. Brief Description of the Related Art

Various types of small-sized optical deflecting elements produced by MEMS (Micro Electro Mechanical Systems) processing technology have been proposed, produced their prototypes and practically employed in optical deflecting systems in order to downsize optical deflecting systems or to produce them at lower costs. Various types of the optical deflecting elements which are actuated by electrostatic method, electromagnetic method, other method or the like, are proposed. For example, various types of the optical deflecting elements actuated by principle of galvanometer (a movable coil actuated by electromagnetic force) are proposed (so that the deflecting elements also are called "galvano mirror") and manufactured by the MEMS processing technology based on the semiconductor manufacturing technology.

These optical deflecting elements employ, for example, beams constituted by a composite beam structure formed out of single crystal silicon and metallic wires on the crystal as shown in FIG. 16 (see references 1 to 3). Because the MEMS processing technology based on the semiconductor manufacturing technology is excellent in processing silicon and aluminum thin film with high precision, and a beam structure which determines actuating performance of the optical deflecting element can be formed with high precision without difficulties. Further since silicon is an elastic material, it is suitable material for the beam structure of the optical deflecting element. Optical deflecting elements based on the silicon are designed and manufactured so as to have actuating frequencies from ca. 200 Hz to several kHz, and employed in various measuring instruments.

Recently, optical deflecting elements actuated at low frequencies less than 150 Hz and in wide deflecting angles more than 50° have been required for applying to, for example, bar-code readers and the like. However, various technical problems arise in realizing such optical deflecting elements by utilizing only the composite beam structure consisting of single crystal silicon and the metal wiring. Hereinafter these problems are explained as referring to FIGS. 17 and 18.

FIGS. 17 and 18 are plan views of optical deflecting elements employing the beams made of single crystal silicon actuating at low frequencies, and these views are for explaining how difficult to constitute downsized optical deflecting elements. In order to actuate the optical deflecting element at a frequency less than 120 Hz, it is necessary to design a long, fine and thin beam, because single crystal silicon has a large Young's modulus of ca. 130 GPa. For example, since the single crystal silicon has a large Young's modulus of ca. 130 GPa, when a movable component is a square of side 3 mm, an optical deflecting element which can actuate at a low frequency less than 150 Hz can be realized by employing a beam with a length more than 20 mm, width less than 30 micrometer and a thickness less than 5 micrometer.

However, as shown in FIG. 17, a beam 508 is formed as a longer one, so that it is restricted to downsize an optical deflecting element 516 up to a certain extent. In order to downsize the optical deflecting element, a folded structured beam 608 might be possible as shown in FIG. 18. However, since silicon is a brittle material, the long, finely and thinly formed beam 608 is apt to be broken and there is a problem in its productivity. Even if such problematic beam is successfully produced, the beam 608 apt to be broken when it is dropped, so that such beam can not be employed by portable products and the like which require sufficient impact resistance, which means applicable fields of such beam are limited. The aluminum wiring is usually employed as the metal wiring to supply power to a coil wiring 612. However, since aluminum has a large Young's modulus of ca. 70 GPa, the beam must be formed much longer, finer and thinner taking influences of the aluminum wiring into consideration.

As explained above, practically it is impossible to produce a downsized optical deflecting element capable of being actuated at low frequencies from the composite beam structure constituted by single crystal silicon and the metal wiring.

As methods to realized optical deflecting element capable of being actuated at low frequencies, methods for utilizing composite beam structures constituted by combinations of polyimide resin and the metal wiring have been proposed (see references 4 to 7) as shown in FIG. 19.

Since polyimide resin has a lower Young's modulus from ca. 2 GPa to ca. 10 GPa than that of single crystal silicon and since polyimide resin is a soft material, a further downsized optical deflecting element can be realized by utilizing a beam 708 constituted by a combination of a polyimide plate 717, a polyimide plate 718 and a metal wiring 719 than by the combination of single crystal silicon and the metal wiring.

For example, when a movable component is formed as a square of side 3 mm, an optical defecting element capable of being actuated at frequencies less than 150 Hz can be realized by setting a length of the beam 708 more than 3 mm, a width of the beam 708 less than 30 micrometer and a thickness of the beam less than 30 micrometer. In addition, since polyimide resin is not so brittle as single crystal silicon, it can be expected to produce an optical deflecting element with higher impact resistance. Since the semiconductor processing technology can be applied to a polyimide processing technology, it is expected to manufacture optical deflecting elements with high precision.

Usually the aluminum wiring is employed as a metal wiring 719 for supplying power to an actuating coil 712. However, since aluminum has a large Young's modulus of ca. 70 GPa, the beam 708 should be formed much longer, finer and thinner taking influences of the aluminum wiring into consideration. For example, when the beam 708 is constituted by a combination of the aluminum wiring having a thickness of 5 micrometer by a width of 6 micrometer and polyimide resin, a length of the beam 708 should be more than 20 mm in order to actuate at frequencies lower than 150 Hz, so that possibility to downsize the optical deflecting element is restricted to a large extent. Also the impact resistance of the beam is reduced, because the beam is finely, long and thinly structured. Since the metal wiring such as the aluminum wiring does not behave as an ideal elastic body when the optical deflecting element is actuated in a wide range, but plastically deformed. As a result, since such metal wiring affects elastic deformation properties of the beam of the optical deflecting element, the metal wiring is not a suitable material for the beam of the optical deflecting element.

As explained above, practically it is impossible to produce a downsized optical deflecting element capable of being actuated at low frequencies from a composite beam structure constituted by polyimide resin and the metal wiring.

As a way to realize an optical deflecting element capable of being actuated at low frequencies, an optical deflecting element 816 manufactured based on a flexible substrate manufacturing technology as shown in FIG. 20 is proposed. The optical deflecting element 816 manufactured in the following manner is proposed (see reference 8). A polyimide sheet component 803 having a beam structure is formed. A reflecting plate, which is formed from a silicon substrate by the semiconductor manufacturing technology, is stuck on to the polyimide sheet component 803. A metal wiring 817 used as a looped jumper wire for supplying power to a plane coil 812 connects two electrode terminals formed outside a beam 808. This technology can be applied to the beam 808 which is mainly formed out of polyimide resin employed as a material having a low Young's modulus. The metal wiring 817 used as the jumper wire reduces a mechanical burden on to the beam 808. In addition, the looped shape of the metal wire 817 can suppress the metal wire from plastic deformation. Therefore, this technology is promising in order to realize an optical deflecting element capable of being actuated at low frequencies.

However, when a jumper wire with a diameter 20 micrometer or more is employed as the metal wiring 817, the metal wiring 817 gives a mechanical burden on the beam 808 to some extent, so that resonance frequencies of the respective optical deflecting elements vary due to dimensional dispersions among the manufactured beams. Consequently, since the resonance frequency is sensitive to product quality of the beam, it is difficult to manufacture optical deflecting elements at a low cost. The optical deflecting element can not be downsized due to the looped (jumping) metal wiring 817. Further, land areas 818 used as the electrode terminals for wiring the metal wiring 817 must be arranged on different positions from the reflecting plate, which hinders the optical deflecting element from downsizing. Since the polyimide sheet component 803 is soft, it is difficult to form the metal wiring 817 used as the jumper wire on the polyimide sheet component 803 by utilizing wire bonding technology, and there is a possibility that the polyimide sheet component is broken when wired. Further it is difficult to fix the jumping metal wiring 817 on to the unstable polyimide sheet component 803 used as the movable component in a stable state.

Reference 1: Japanese laid open Patent No. 2000-35549
Reference 2: Japanese laid open Patent No. 2004-198648
Reference 3: Japanese laid open Patent No. 2005-195639
Reference 4: Japanese laid open Patent No. 10-123449
Reference 5: Japanese laid open Patent No. 11-202254
Reference 6: Japanese laid open Patent No. 11-242180
Reference 7: Japanese laid open Patent No. 11-305162
Reference 8: Japanese laid open Patent No. 2005-99063

SUMMARY OF THE INVENTION

The present invention is carried out in view of the above-mentioned problems in order to provide an electromagnetically actuating optical deflecting element which can be manufactured out of the reduced number of components and is capable of being actuated at lower frequencies and at wider deflecting angles, without causing mechanical influences of the metal wiring on a beam of the optical deflecting element.

The above-mentioned objectives of the present invention are solved by any one of the electromagnetically actuating optical deflecting elements constituted in the following manners (1) to (10).

(1) An electromagnetically actuating optical deflecting element comprising: a movable part having a light reflecting plane and a coil; a base component having a magnetic field generating means; and a pair of beams which axially support the movable part on to the base component, wherein: the movable part is actuated by an electromagnetic force generated by an electric current flowing through the coil and the magnetic field generating means; and the pair of beams are constituted by one material having functions to perform as conductors for supplying electric current to the coil, to support the movable part, to perform as springs for returning said movable part to a starting position.

(2) The electromagnetically actuating optical deflecting element according to (1), wherein: a material for the beams is a conductive polymer.

(3) The electromagnetically actuating optical deflecting element according to (2), wherein: the conductive polymer is a conductive silicone rubber containing conductive particles.

(4) The electromagnetically actuating optical deflecting element according to any one of (1) to (3), wherein: the pair of beams are respectively constituted by a fixing part formed at one end of the beam for being fixed to the base component and a sticking part formed at the other end of the beam for being stuck to the movable part.

(5) The electromagnetically actuating optical deflecting element according to (4) wherein: the light reflecting plane is stuck to one surface of the movable part which faces the sticking parts; and the coil is stuck to other surface of the movable part which faces opposite to the sticking parts.

(6) The electromagnetically actuating optical deflecting element according to (4), wherein: the movable part having the light reflecting plane and the coil is stuck to one surface of the sticking parts which face the movable part.

(7) The electromagnetically actuating optical deflecting element according to (6), wherein: the light reflecting plane and the coil are stuck to one surface of the movable part which faces the sticking parts.

(8) The electromagnetically actuating optical deflecting element according to (6), wherein: the light reflecting plane is arranged on one surface of the movable part; and the coil is arranged on the other surface of the movable part.

(9) The electromagnetically actuating optical deflecting element according to any one of (6) to (8), wherein: the movable part is integrally formed with the light reflecting plane and the coil.

(10) The electromagnetically actuating optical deflecting element according to any one of (1) to (9), wherein: the magnetic field generating means is a permanent magnet integrally formed with resin by an insert molding technology.

The present invention can provide the electromagnetically actuating optical deflecting elements which can be manufactured out of reduced number of components and are capable of being actuated at lower frequencies and at wider deflecting angles without causing mechanical influences of the metal wiring on the beam of the optical deflecting element.

DETAILED DESCRIPTION OF THE PREFERRED EMBODIMENTS

Hereinafter, the preferred embodiments by the present invention are explained in detail as referring to drawings.

Embodiment 1

Figure 1:
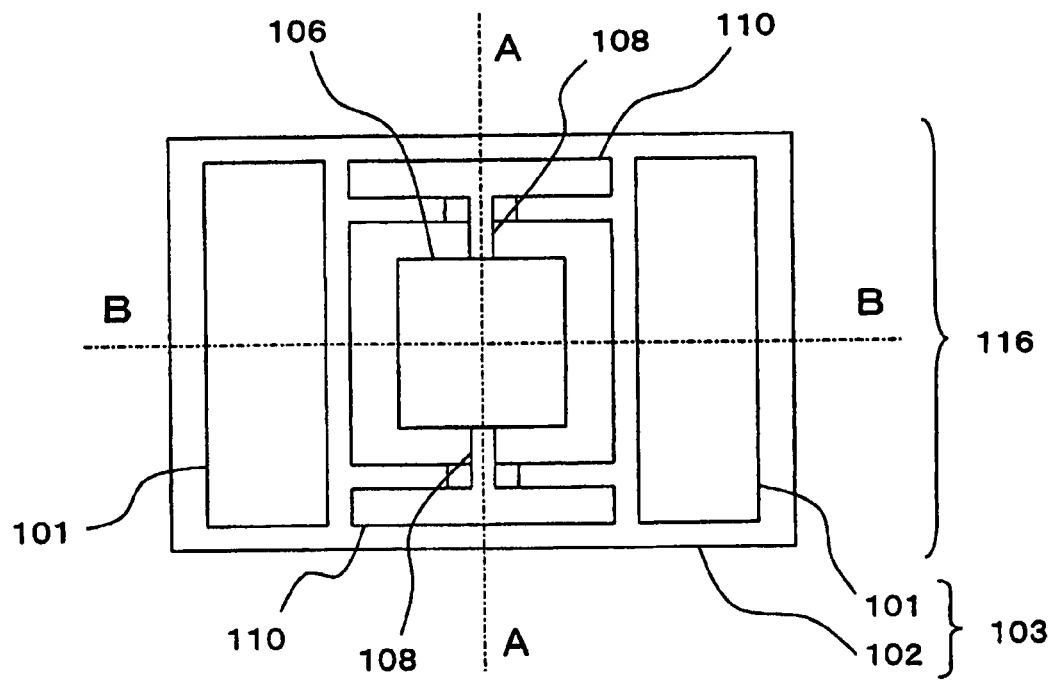
FIG. 1 is a plan view illustrating a constitution of the electromagnetically actuating optical deflecting element of embodiment 1.
Figure 2:
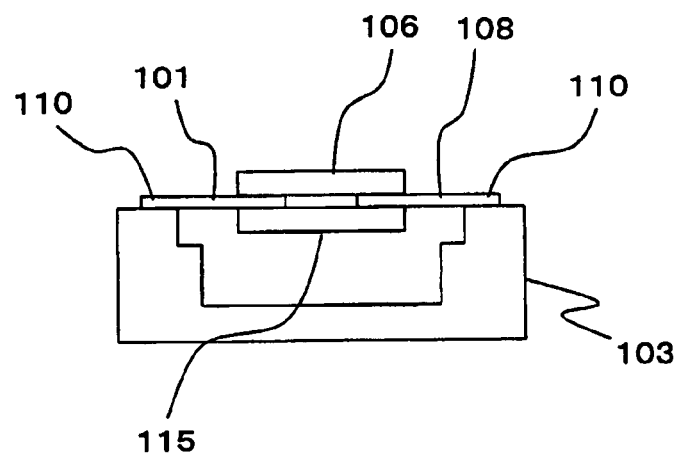
FIG. 2 is a cross-sectional view along line A-A in FIG. 1.
Figure 3:
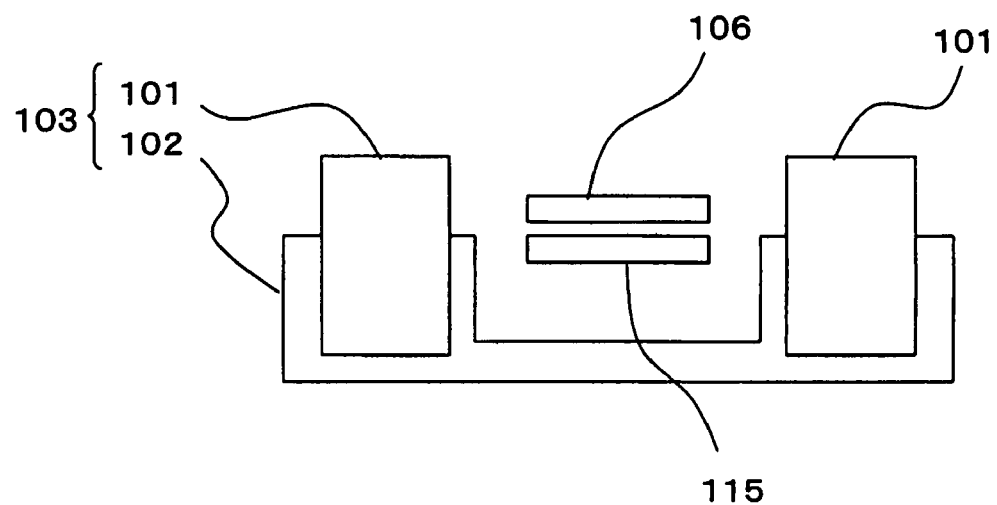
FIG. 3 is a cross-sectional view along line B-B in FIG. 1.

FIGS. 1, 2 and 3 are drawings illustrating the constitution of "the electromagnetically actuating optical deflecting element" by embodiment 1. FIG. 1 is the plan view of an electromagnetically actuating optical deflecting element 116, FIG. 2 is the cross-sectional view along line A-A in FIG. 1 and FIG. 3 is the cross-sectional view along line B-B in FIG. 1.

Figure 4:
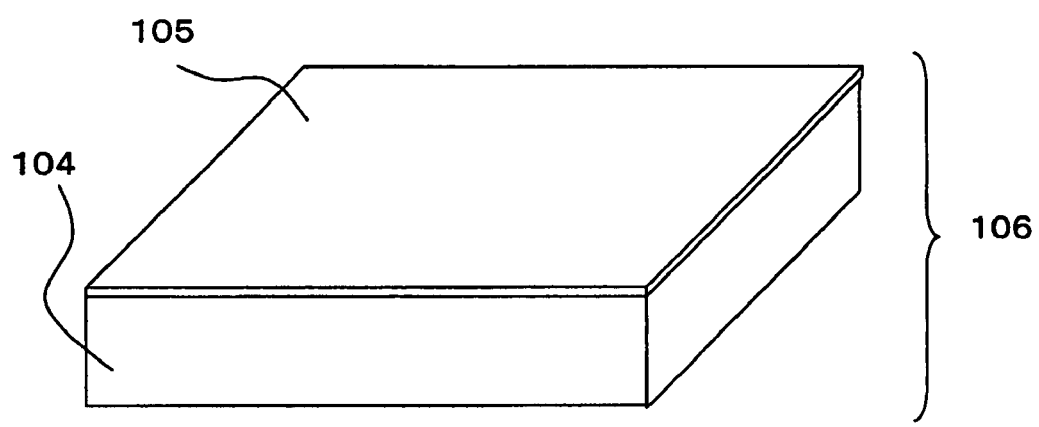
FIG. 4 is a perspective view of a reflecting plate of embodiment 1.
Figure 5:
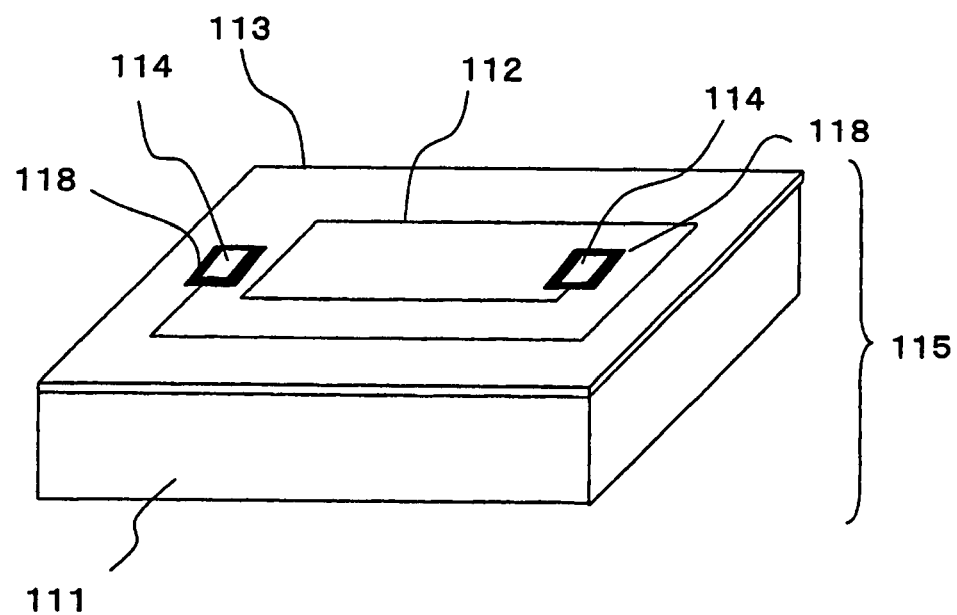
FIG. 5 is a perspective view illustrating a constitution of a coil component of embodiment 1.

FIG. 4 is the perspective view of a reflecting plate 106 by embodiment 1, a component for reflecting light. FIG. 5 is a perspective view illustrating a constitution of a coil component 115 in embodiment 1.

Figure 6:
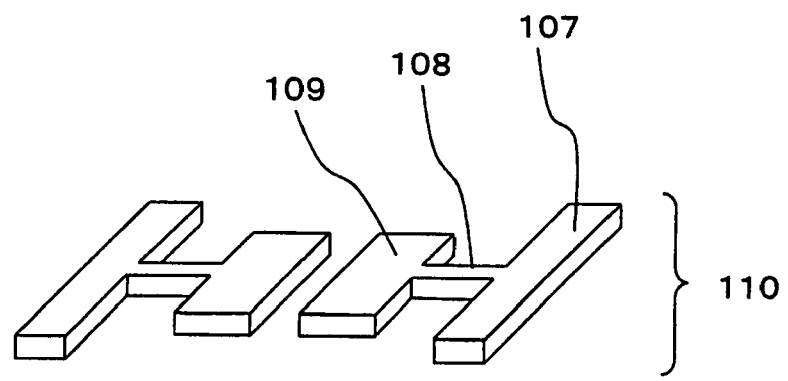
FIG. 6 is a perspective view of paired conductive polymer components of embodiment 1.
Figure 7:
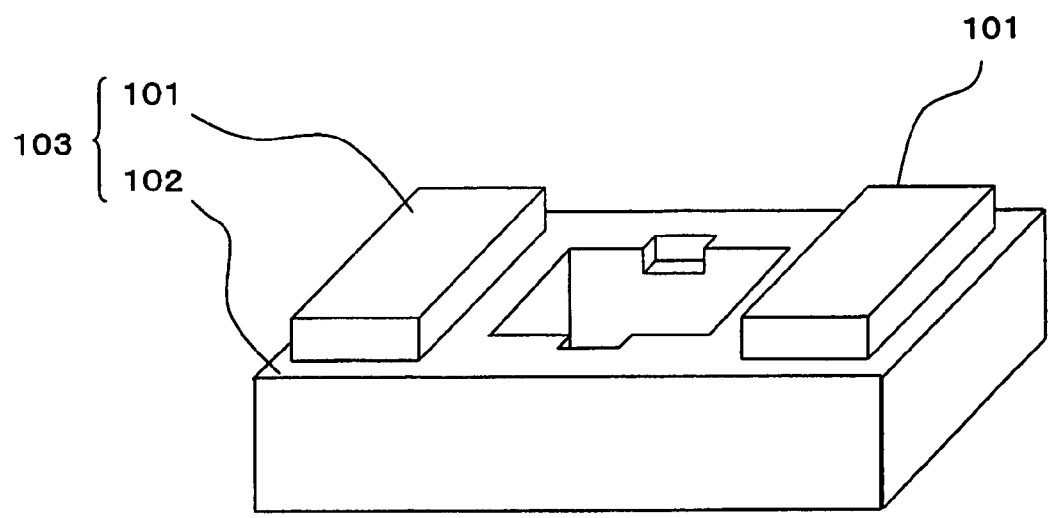
FIG. 7 is a perspective view illustrating a constitution of a base component of embodiment 1.

FIG. 6 is the perspective view illustrating paired conductive polymer component 110 comprising a pair of beam 108 for holding a movable component. FIG. 7 is a perspective view illustrating a base component 103 formed by a resin base 102 in which permanent magnets 101 are molded by an insert molding method.

The electromagnetically actuating optical deflecting element 116 shown in FIGS. 1, 2 and 3 is formed in the following manner. Rear surfaces of respective fixing parts 107 of the paired conductive polymer components 110 shown in FIG. 6 are stuck on to the resin base 102 shown in FIG. 7. Front surfaces of respective sticking parts 109 of the paired conductive polymer components 110 are stuck to a rear surface of a glass substrate 104 of the reflecting plate 106. Rear surfaces of the respective sticking parts 109 of the paired conductive polymer components 110 are fitted a front surface of the coil component 115, where a patterned insulating protective layer is formed. And the fitted portions are stuck together by using a conductive adhesive.

The reflecting plate 106 shown in FIG. 4 is formed as follows. On the glass substrate 104 with a thickness of 600 micrometer, metal thin film 105 is formed by a metal deposition method so that a stock for the reflecting plate 106 is prepared. The stock is cut by a dicing method so as to obtain a desired sized reflecting plate 106, for example a square of side 3 mm. In the present embodiment 1, the glass substrate 104 is employed as a substrate for the reflecting plate 106, but a silicon substrate can be also employed. It is desirable to form an oxide film, which plays a role of insulator, on the surface of the silicon substrate by a thermal oxidation method.

The coil component 115 shown in FIG. 5 can be easily obtained by utilizing the MEMS processing technology based on elemental technologies such as a photolithography technology, a metal plating technology and the like. In the present embodiment 1, the coil component 115 is obtained in the following manner. A coil wiring pattern 112 with a thickness of 5 micrometer is formed by gold on a glass substrate 111 with a thickness of 600 micrometer by utilizing the photolithography technology and the metal plating technology. A patterned insulating protective film 113 is formed over the coil wiring pattern 112 by a photosensitive resist by utilizing the photolithography technology, so that a stock for the coil component is prepared. The stock is cut by dicing method so as to obtain the coil component 115 with a square of side 3 mm.

In the present embodiment 1, the coil wiring pattern 112 is formed by wiring gold, but it is not limited to gold. Other metals, for example, aluminum, nickel, copper, titanium, chromium and the like can be employed. In the present embodiment 1, the patterned insulating protective film 113 is formed by the photosensitive resist, but it is not limited to the photosensitive resist, silicon nitride, silicon oxide, aluminum oxide and the like can be also employed. Further, the coil component 115 consists of one layer of the gold coil wiring pattern 112, but it is not limited to one layer. Multi-layered wiring pattern can be formed by repeating the photolithography technology and the metal plating technology. Electromagnetic force for actuating the movable component can be increased as the number of the layers increase, so that an optical deflecting element capable of actuating at a wider deflection angle is obtained.

A reference numeral "118" is connecting pads connected to the both ends of the coil wiring pattern 112. At least portions of the connecting pads 118 are protruded outside of the patterned insulating protective film 113 through pad openings 114. Via the pad openings 114 of the patterned insulating protective film 113, the connecting pads 118 are electrically connected to the sticking parts 109 of the paired conductive polymer components 110 by a conductive adhesive.

The paired conductive polymer components 110 illustrated in FIG. 6 are formed out of a conductive polymer film by a punching technology. In the present embodiment 1, a conductive silicone rubber film containing silver particles is employed as a stock for the conductive polymer components 110. In the present embodiment 1, the conductive polymer components 110 are formed by the punching technology, but they can be formed by a die molding technology. Since three-dimensional conductive polymer components can be obtained by utilizing the die molding technology, shapes of the conductive polymer components can be designed more freely. As widely known, since Young's modulus of silicone rubber can be controlled in a wide range from ca. 500 KPa to ca. 20 MPa by controlling a containing ratio of sulfur in the silicone rubber, a resonance frequency of a system can be changed by controlling a vulcanization process without changing dimensions of components of the system, so that fabrication costs of photo masks, dies and the like are not required, and further a time required for developing products can be reduced.

In the present embodiment 1, the conductive polymer component 110 having a beam 108 with a length of 1.0 mm, a width of 0.25 mm and a thickness of 0.3 mm is formed out of a silicone rubber with a Young's modulus of ca. 1 MPa obtained by controlling the vulcanizing process, as a result an optical deflecting element, which can be actuated at a frequency lower than 150 Hz, is realized.

In the present embodiment 1, since the conductive polymer component 110 is formed out of a conductive silicone rubber containing silver particles having diameters less than 100 micrometer, silver particles in the silicone rubber can be moved freely without any constraint as respective silver particles being contacting each other even when the optical deflecting element is actuated at a wide angle. And elastic deformation property of the conductive silicone rubber is not affected even when the metal wiring is plastically deformed. In the present embodiment 1, the conductive polymer component 110 is formed out of the silicone rubber which contains silver particles, but the material for the conductive polymer component is not limited to the silicone rubber. Any materials, for example, synthetic rubber, polyimide, silicone resin, Teflon® rein, polyethylene resin, polycarbonate resin, polypropylene resin and the like, can be employed as far as the materials are elastic. Connecting pads (not shown in the drawings) used as external connecting terminals are arranged in the fixing parts 107.

Permanent magnets 101 illustrated in FIG. 7, means for generating magnetic field, are molded into the resin base 102 by the insert molding so as to obtain the base component 103. As the permanent magnets, neodymium alloy blocks protected by nickel film are employed and magnetized after molded into polycarbonate resin by the insertion molding. In the present embodiment 1, the resin base 102 is formed by molding polycarbonate resin, but it is not limited to polycarbonate resin. Any insulating materials with high strength, for example, Teflon® rein, polyethylene resin, polypropylene resin and the like can be employed.

As explained above, a plurality of functions to perform as conductors for supplying electric current to the coil, to support the movable component, to perform as springs for returning the movable component to a starting position are attained by only one material, namely the conductive polymer resin. Since no metal wiring is constituted in the beam, particularly which is formed out of the conductive polymer resin, a small-sized electromagnetically actuating optical deflecting element capable of being actuated at a wide angle at a low frequency can be provided without affecting physical properties and elastic deformation properties of the beam.

Embodiment 2

Figure 8:
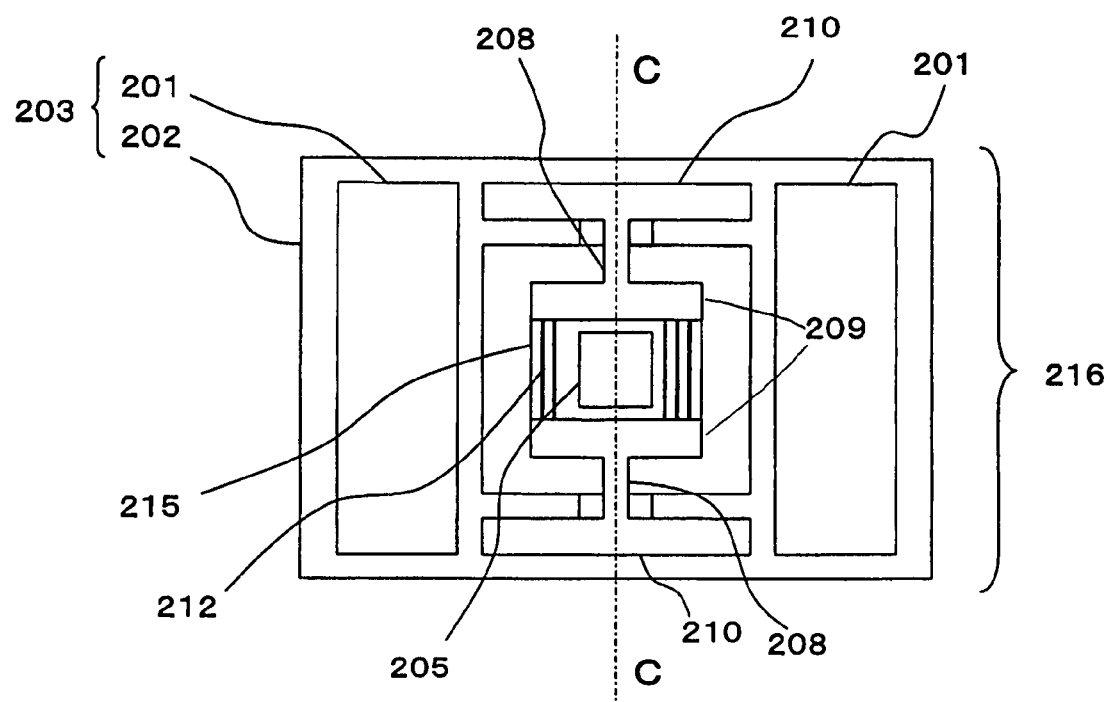
FIG. 8 is a plan view illustrating a constitution of the electromagnetically actuating optical deflecting element of embodiment 2.
Figure 9:
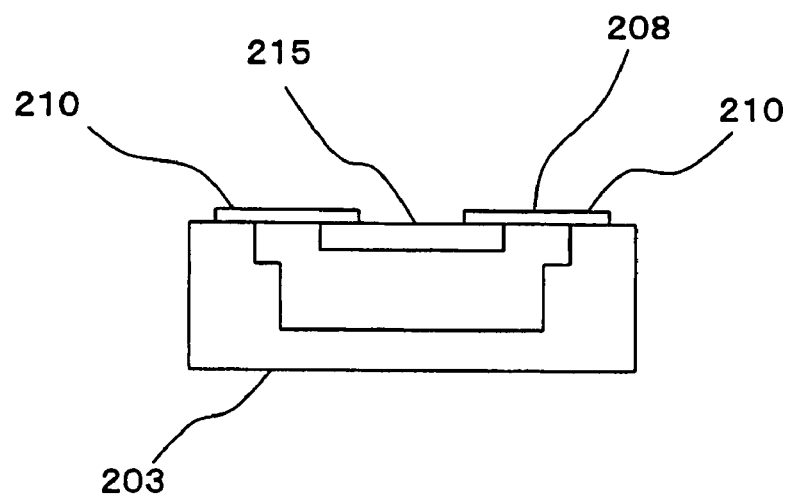
FIG. 9 is a cross-sectional view along line C-C in FIG. 8.

FIGS. 8, 9 illustrate the constitutions of the electromagnetically actuating optical deflecting element by embodiment 2. FIG. 8 is the plan view of an electromagnetically actuating optical deflecting element 216 and FIG. 9 is the cross-sectional view along line C-C in FIG. 8. In the present embodiment, a light reflecting plane and a coil are formed on the same surface of a glass substrate.

Figure 10:
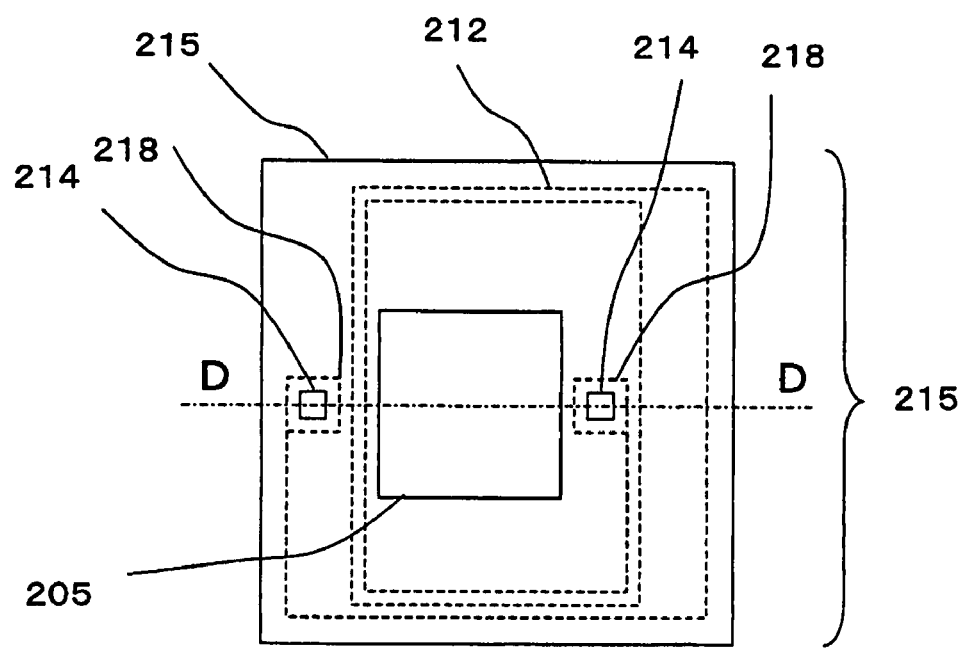
FIG. 10 is a plan view illustrating a constitution of a movable component of embodiment 2.
Figure 11:
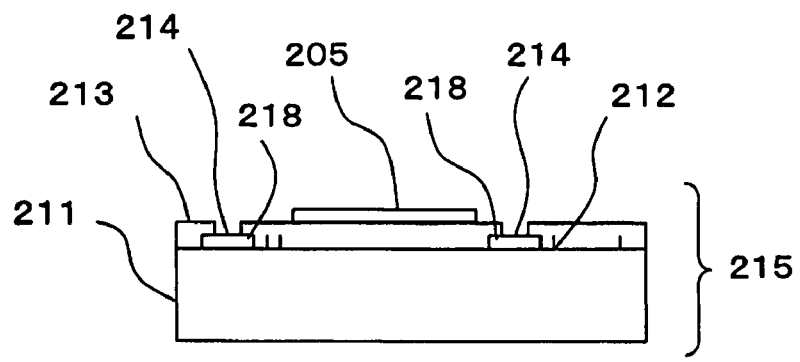
FIG. 11 is a cross-sectional view along line D-D in FIG. 10.

FIGS. 10, 11 illustrate the constitutions of a movable component 215, which is formed by integrally combining a metal film 205 used as a light reflecting film and a coil wiring pattern 212. FIG. 10 is the plan view of the movable component 215 and FIG. 11 is the cross-sectional view along line D-D in FIG. 10

The same types of respective materials as in embodiment 1 can be employed for forming conductive polymer components 210 and a base component 203. In the same way as in embodiment 1, the electromagnetically actuating optical deflecting element illustrated in FIGS. 8, 9 is formed by adhering the rear surfaces of the fixing parts of the respective conductive polymer resin components 210 on to the base component 203, and by adhering the rear surfaces of the sticking parts of the respective conductive polymer components 210 to the front surface of the movable component 215, where an insulating film pattern 213 and pad openings 214 are formed, by using a conductive adhesive.

In FIG. 11, a reference numeral "211" is a glass substrate, "212" is a coil wiring pattern formed on the glass substrate 211. A reference numeral "218" is coil pads formed at both ends of the coil wiring pattern 212. At least portions of the coil pads are exposed outside through openings 214 formed in the insulating film pattern 213. A reference numeral "205" is a metal film functioning as a light reflective film formed on the insulating film pattern 213.

As illustrated in the drawings, the movable component 215 is constituted by the coil wiring pattern 212 and the metal film 215 which are formed on the same face of the glass substrate 211. The connecting pads 218 are electrically connected to sticking parts 209 of the conductive polymer components 210 via the openings 214 formed in the insulating film pattern 213 by using a conductive adhesive.

Also in the present embodiment, a plurality of functions to perform as conductors for supplying electric current to the coil, to support the movable component, to perform as springs for returning the movable component to a starting position are attained by only one material, namely the conductive polymer resin. Since no metal wiring is constituted in the beam, particularly which is formed out of the conductive polymer resin, a small-sized electromagnetically actuating optical deflecting element capable of being actuated at a wide angle at a low frequency can be provided without affecting physical properties and elastic deformation properties of the beam.

Further, since the light reflecting surface and the coil are integrally formed as one component, the number of components is reduced, so that electromagnetically actuating optical deflecting elements can be provided at less expensive cost.

Embodiment 3

Figure 12:
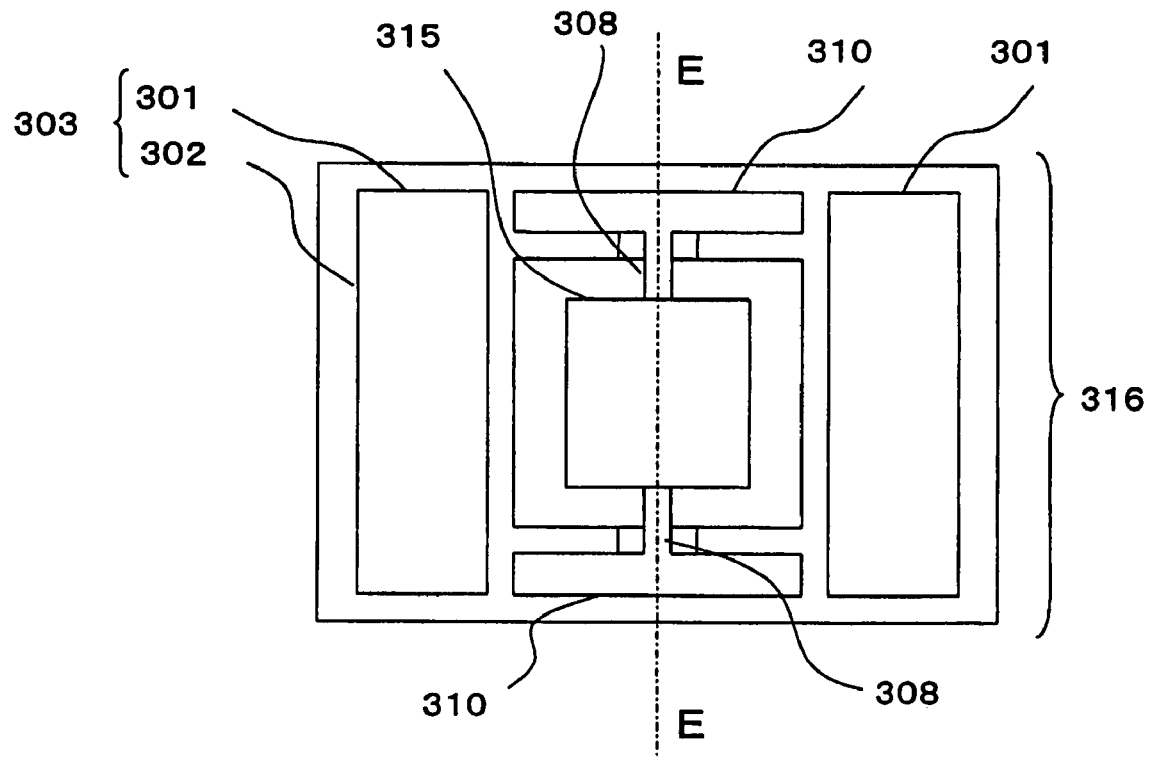
FIG. 12 is a plan view illustrating a constitution of the electromagnetically actuating optical deflecting element of embodiment 3.
Figure 13:
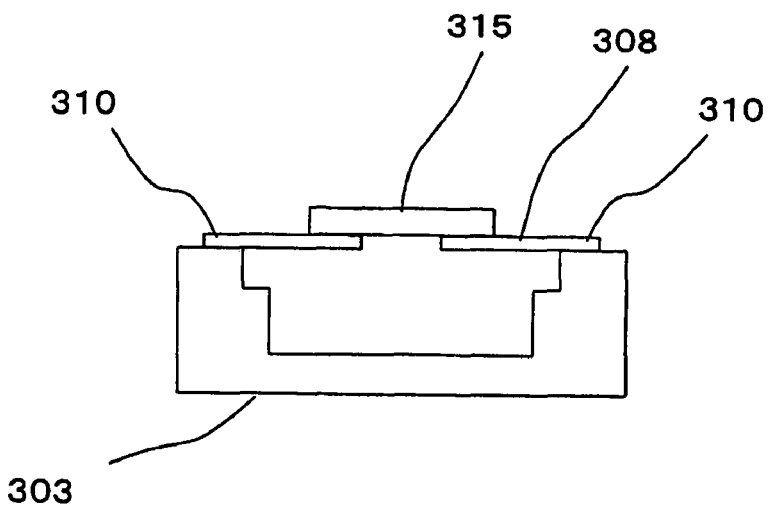
FIG. 13 is a cross-sectional view along line E-E in FIG. 12.

FIGS. 12, 13 illustrate the constitutions of the electromagnetically actuating optical deflecting element by embodiment 3. FIG. 12 is the plan view of an electromagnetically actuating optical deflecting element 316 and FIG. 13 is the cross-sectional view along line E-E in FIG. 12. In the present embodiment, light reflecting planes and coils are formed on the both surfaces of a glass substrate.

Figure 14:
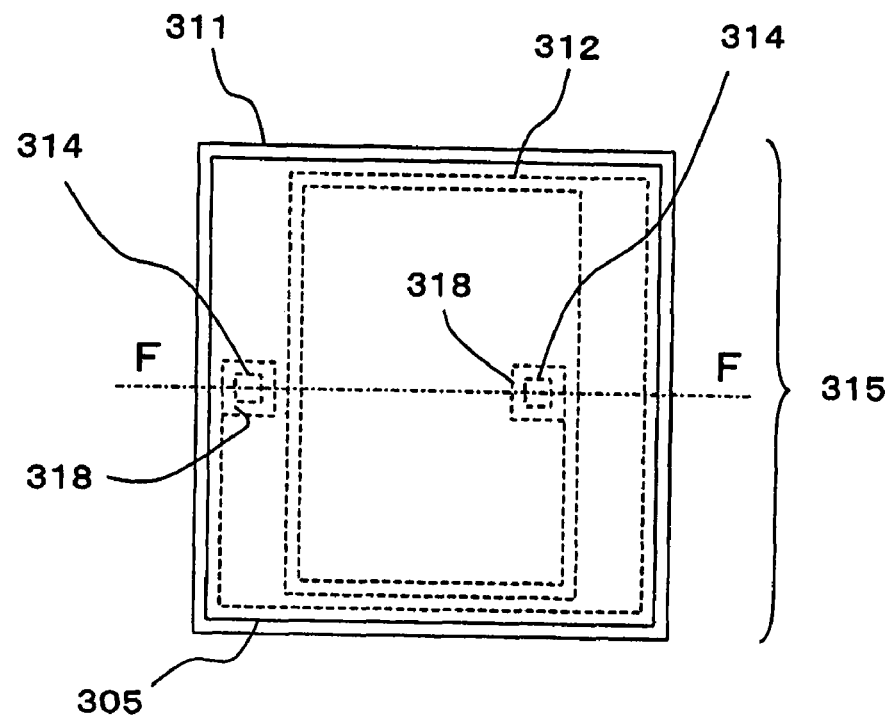
FIG. 14 is a plan view illustrating a constitution of a movable component of embodiment 3.
Figure 15:
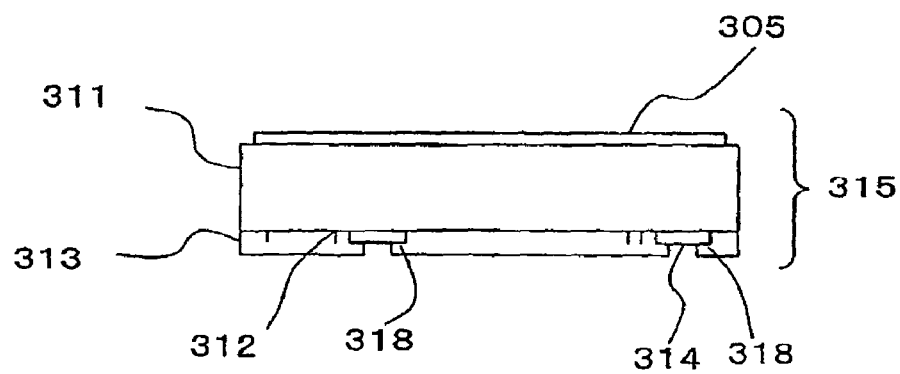
FIG. 15 is a cross-sectional view along line F-F in FIG. 14.
Figure 16:
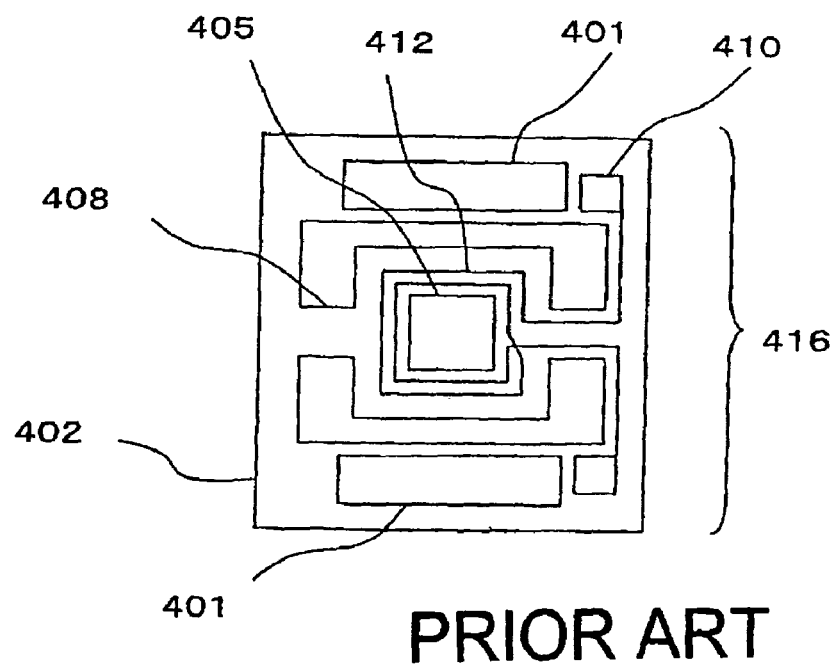
FIG. 16 is a plan view illustrating a constitution of a conventional electromagnetically actuating optical deflecting element.
Figure 17:
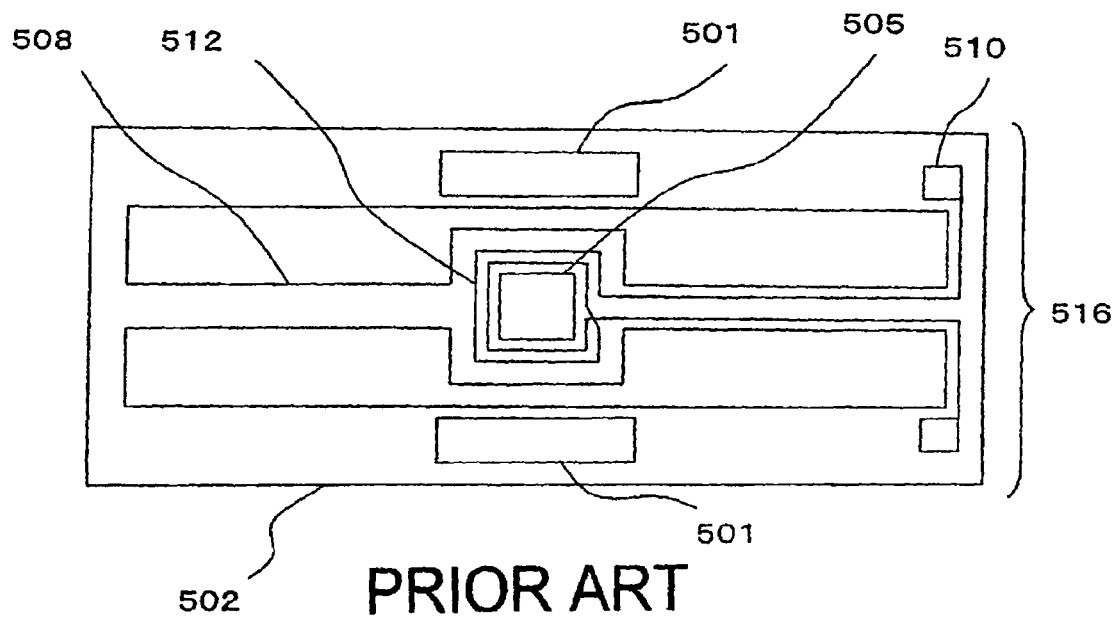
FIG. 17 is a plan view illustrating a constitution of a conventional electromagnetically actuating optical deflecting element.
Figure 18:
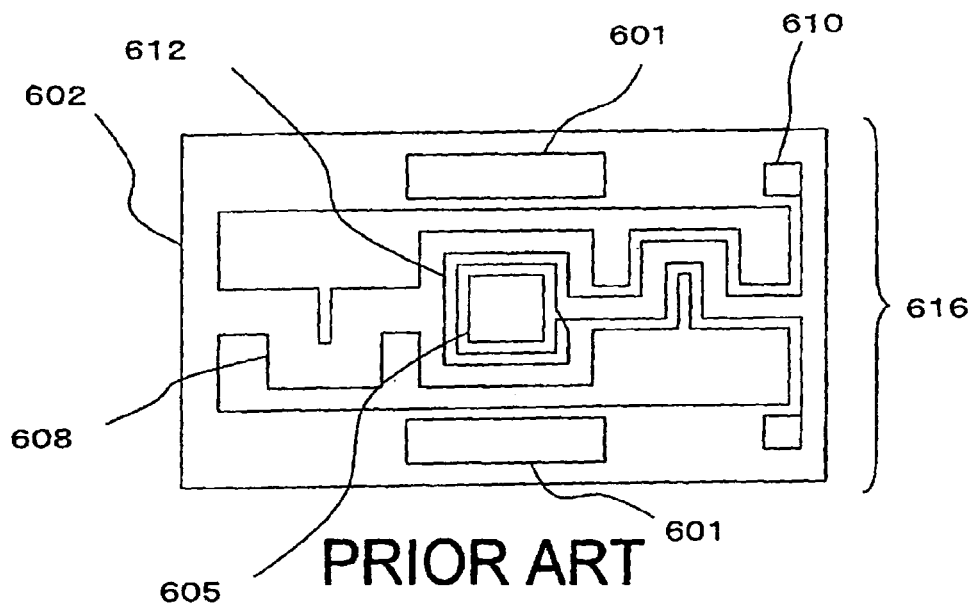
FIG. 18 is a plan view illustrating a constitution of a conventional electromagnetically actuating optical deflecting.
Figure 19:
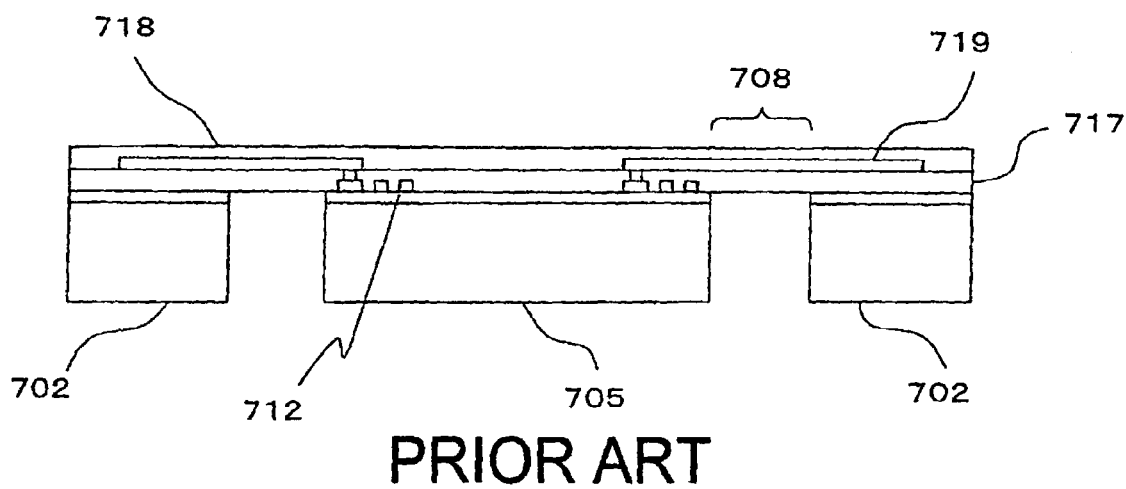
FIG. 19 is a cross-sectional view illustrating a constitution of a conventional electromagnetically actuating optical deflecting element.
Figure 20:
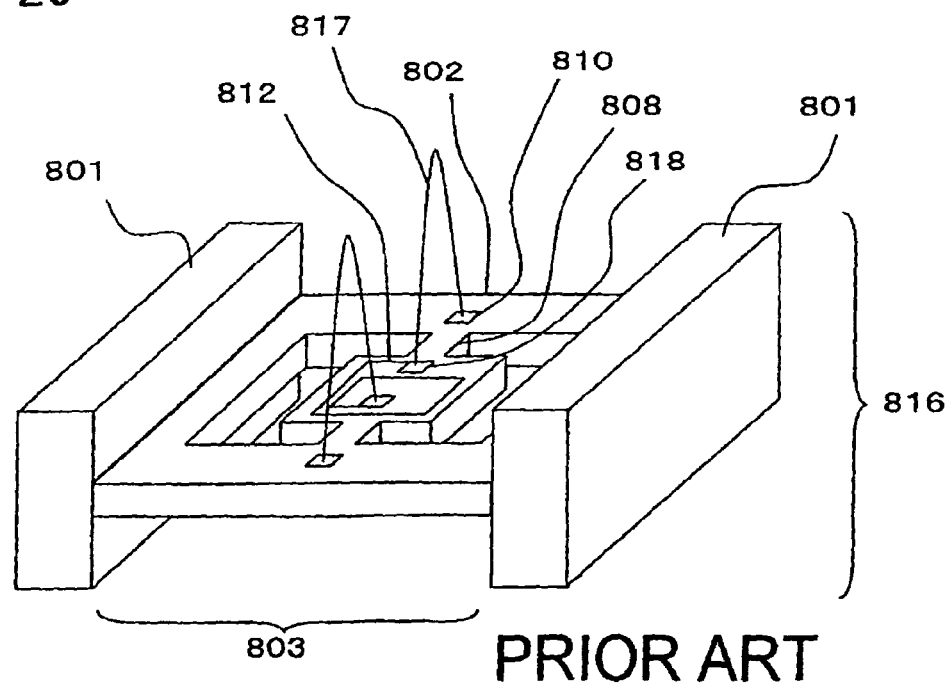
FIG. 20 is a perspective view illustrating a constitution of a conventional electromagnetically actuating optical deflecting element.

FIGS. 14, 15 illustrate the constitutions of a movable component 315, which is formed by integrally combining a metal film 305 used as a light reflecting film and a coil wiring pattern 312 on front and rear surfaces of the glass substrate. FIG. 14 is the plan view of the movable component 315 and FIG. 15 is the cross-sectional view along line F-F in FIG. 14.

In FIGS. 14, 15, a reference numeral "311" is a glass substrate, and "305" is a metal film functioning as the light reflective film formed on front surface of the glass substrate 311. A reference numeral "312" is a coil wiring pattern formed on the rear surface of the glass substrate 311. A reference numeral "318" is coil pads formed at both ends of the coil wiring pattern 312. At least portions of the coil pads are exposed outside through openings 314 formed in an insulating film pattern 313.

The same types of respective materials as in embodiment 1 can be employed for forming conductive polymer components 310 and a base component 303. The electromagnetically actuating optical deflecting element 316 illustrated in FIGS. 12, 13 is formed by adhering the rear surface of the fixing parts of the respective conductive polymer resin components 310 on to the base component 303, and by adhering the front surface of the sticking parts of the respective conductive polymer components 310 to the rear surface of the movable component 315 by using a conductive adhesive.

Also in the present embodiment, a plurality of functions to perform as conductors for supplying electric current to the coil, to support the movable component, to perform as springs for returning the movable component to a starting position are attained by only one material, namely the conductive polymer resin. Since no metal wiring is constituted in the beam, particularly which is formed out of the conductive polymer resin, a small-sized electromagnetically actuating optical deflecting element capable of being actuated in a wide angle at a low frequency can be provided without affecting physical properties and elastic deformation properties of the beam.

Further, since the light reflecting surface and the coil are integrally formed as one component, the number of components is reduced, so that electromagnetically actuating optical deflecting elements can be provided at less expensive cost. And since a surface area of the reflecting plane is not affected by an area required for the coil wiring pattern, the surface area of the reflecting plane can extend up to a surface area of the movable component. Further, since the area required for the coil wiring pattern is not affected by the surface area of the reflecting plane, a turning number of the coil wiring pattern can be increased easily, as a result electromagnetic force can be raised easily, so that an electromagnetically actuating optical deflecting element capable of being actuated at a wider angle can be realized easily.

What is claimed is:

1. An electromagnetically actuating optical deflecting element comprising:
    a movable part having a light reflecting plane and a coil;
    a base component having a magnetic field generating means; and
    a pair of beams which axially support said movable part on to said base component, wherein:
    said movable part is actuated by an electromagnetic force generated by an electric current flowing through said coil and said magnetic field generating means; and
    said pair of beams consisting of one material having functions to perform as conductors for supplying electric current to said coil, to support said movable part, to perform as springs for returning said movable part to a starting position.

2. The electromagnetically actuating optical deflecting element according to claim 1, wherein:
    the material for said beams is a conductive polymer.

3. The electromagnetically actuating optical deflecting element according to claim 2, wherein:
    said conductive polymer is a conductive silicone rubber containing conductive particles.

4. The electromagnetically actuating optical deflecting element according to claim 1, wherein:
    said pair of beams are respectively constituted by a fixing part formed at one end of said beam for being fixed to said base component and a sticking part formed at the other end of said beam for being stuck to said movable part.

5. The electromagnetically actuating optical deflecting element according to claim 4, wherein:
    said light reflecting plane is stuck to one surface of said movable part which faces said sticking parts; and
    said coil is stuck to other surface of said movable part which faces opposite to said sticking parts.

6. The electromagnetically actuating optical deflecting element according to claim 4, wherein:
    said movable part having said light reflecting plane and said coil is stuck to one surface of said sticking parts which face said movable part.

7. The electromagnetically actuating optical deflecting element according to claim 6, wherein:
    said light reflecting plane and said coil are stuck to one surface of said movable part which faces said sticking parts.

8. The electromagnetically actuating optical deflecting element according to claim 6, wherein:
    said light reflecting plane is arranged on one surface of said movable part; and
    said coil is arranged on the other surface of said movable part.

9. The electromagnetically actuating optical deflecting element according to claim 6, wherein:
    said movable part is integrally formed with said light reflecting plane and said coil.

10. The electromagnetically actuating optical deflecting element according to claim 1, wherein:
    said magnetic field generating means is a permanent magnet integrally formed with resin by an insert molding technology.

* * * * *